(12) United States Patent
Lam

(10) Patent No.: US 11,561,855 B2
(45) Date of Patent: *Jan. 24, 2023

(54) ERROR HANDLING OPTIMIZATION IN MEMORY SUB-SYSTEM MAPPING

(71) Applicant: Micron Technology, Inc., Boise, ID (US)

(72) Inventor: Johnny A. Lam, Firestone, CO (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/530,313

(22) Filed: Nov. 18, 2021

(65) Prior Publication Data

US 2022/0075690 A1 Mar. 10, 2022

Related U.S. Application Data

(63) Continuation of application No. 16/912,397, filed on Jun. 25, 2020, now Pat. No. 11,210,168.

(51) Int. Cl.
*G06F 11/10* (2006.01)
*G06F 11/07* (2006.01)
*G06F 11/20* (2006.01)
*G06F 12/02* (2006.01)

(52) U.S. Cl.
CPC ........ *G06F 11/1068* (2013.01); *G06F 11/076* (2013.01); *G06F 11/0772* (2013.01); *G06F 11/203* (2013.01); *G06F 12/0246* (2013.01); *G06F 12/0253* (2013.01); *G06F 2212/403* (2013.01); *G06F 2212/7201* (2013.01); *G06F 2212/7211* (2013.01)

(58) Field of Classification Search
CPC .............. G06F 11/1068; G06F 11/076; G06F 11/0772; G06F 11/203; G06F 12/0246; G06F 12/0253; G06F 2212/403; G06F 2212/7201; G06F 2212/7211
USPC ................................ 714/763, 799, 718, 723
See application file for complete search history.

(56) References Cited

U.S. PATENT DOCUMENTS

| | | | | |
|---|---|---|---|---|
| 5,592,662 A | * | 1/1997 | Sawada | ................. G06F 3/0601 |
| 5,847,995 A | * | 12/1998 | Kobayashi | ............. G11C 29/78 |
| | | | | 365/185.18 |
| 8,412,880 B2 | | 4/2013 | Leibowitz et al. | |
| 8,489,805 B2 | * | 7/2013 | Fisher | ..................... G06F 12/02 |
| | | | | 711/103 |

(Continued)

FOREIGN PATENT DOCUMENTS

CN 103699457 12/2011

OTHER PUBLICATIONS

Chinese Office Action for Chinese Application No. 202110710628.0 dated Mar. 1, 2022, 20 pages.

*Primary Examiner* — John J Tabone, Jr.
(74) *Attorney, Agent, or Firm* — Lowenstein Sandler LLP

(57) ABSTRACT

A system including a memory device having blocks of memory cells and a processing device operatively coupled to the memory device. The processing device to perform operations comprising: detecting an error event triggered within a source block of the memory cells; reading data from the source block; writing the data into a mitigation block that is different than the source block; and replacing, in a mapping data structure, a first identifier of the source block with a second identifier of the mitigation block.

20 Claims, 8 Drawing Sheets

(56) References Cited

U.S. PATENT DOCUMENTS

| | | | |
|---|---|---|---|
| 8,560,698 B2* | 10/2013 | Kulkarni | G06Q 10/06 709/226 |
| 8,677,203 B1* | 3/2014 | Shalvi | G06F 11/1068 714/747 |
| 10,101,942 B1* | 10/2018 | Parker | G06F 12/0246 |
| 10,169,232 B2 | 1/2019 | Simionescu et al. | |
| 2010/0115182 A1 | 5/2010 | Murugesan | |
| 2012/0117314 A1* | 5/2012 | Fisher | G06F 12/02 711/103 |
| 2018/0260132 A1* | 9/2018 | Wang | G06F 12/0246 |
| 2020/0105363 A1* | 4/2020 | Natarajan | G11C 29/4401 |
| 2020/0334139 A1* | 10/2020 | Hwang | G06F 12/0882 |
| 2020/0349065 A1* | 11/2020 | Ke | G06F 12/0246 |
| 2020/0401516 A1* | 12/2020 | Ke | G06F 12/0882 |
| 2021/0117122 A1* | 4/2021 | Byun | G06F 3/0608 |
| 2021/0191808 A1* | 6/2021 | Bhardwaj | G06F 12/0246 |
| 2021/0191853 A1* | 6/2021 | Xu | G06F 1/3275 |

* cited by examiner

ERROR HANDLING OPTIMIZATION IN MEMORY SUB-SYSTEM MAPPING

RELATED APPLICATIONS

This application is a continuation of U.S. patent application Ser. No. 16/912,397, filed on Jun. 25, 2020, which is incorporated herein by reference in its entirety for all purposes.

TECHNICAL FIELD

Embodiments of the disclosure relate generally to memory sub-systems, and more specifically, error handling optimization in memory sub-system mapping.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
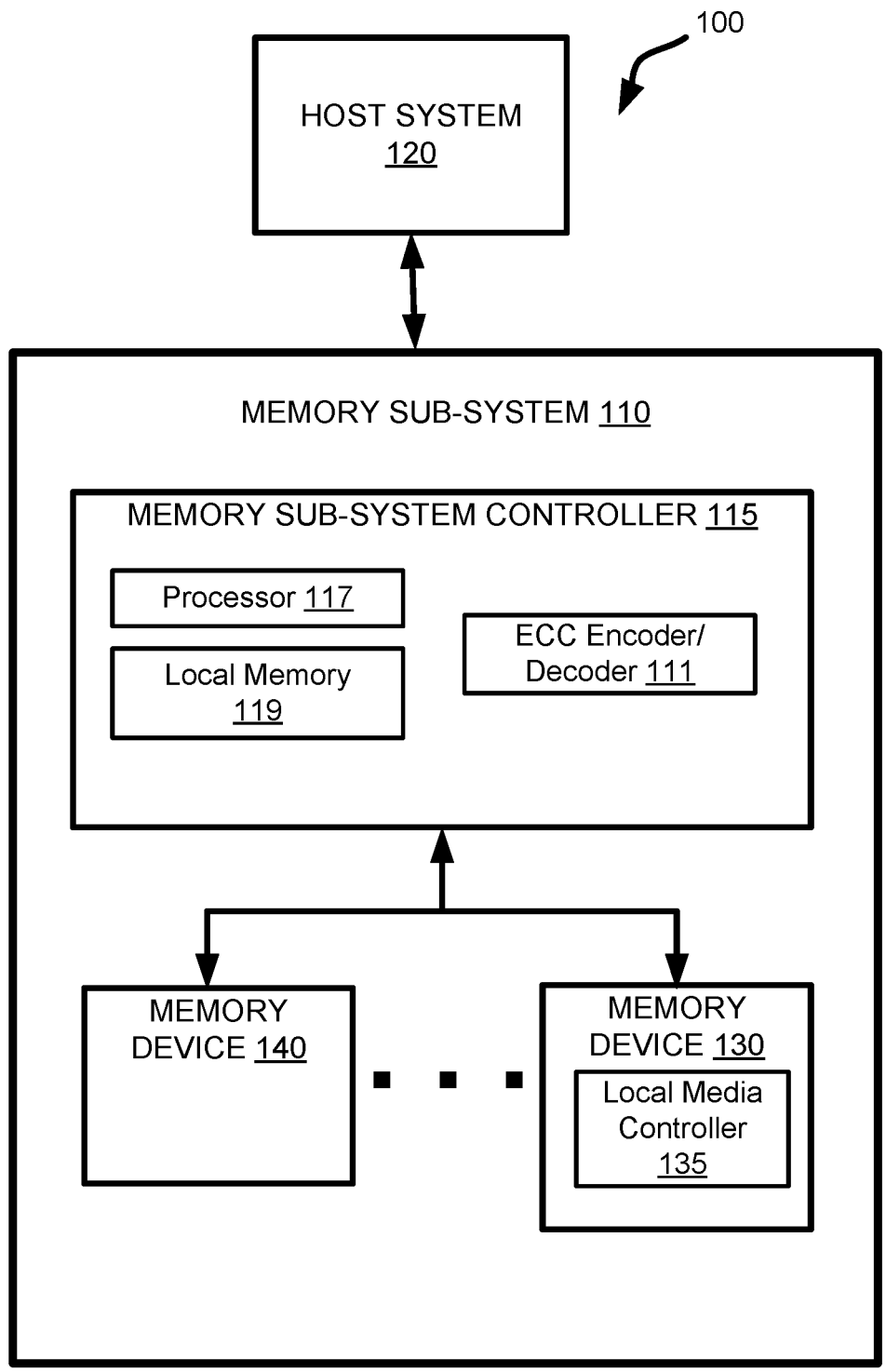
FIG. 1A illustrates an example computing system that includes a memory sub-system according to embodiments.

Aspects of the present disclosure are directed to error handling optimization in memory sub-system mapping. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory devices can be non-volatile memory devices that can store data from the host system. One example of a non-volatile memory device is a negative-and (NAND) memory device. Other examples of non-volatile memory devices are described below in conjunction with FIG. 1. Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1," or combinations of such values.

Various access operations can be performed on the memory cells. For example, data can be written to, read from, and erased from memory cells. Memory cells can be grouped into a write unit, such as a page. For some types of memory devices, a page is the smallest write unit. A page is a set of cells across the same word line. A page size represents a particular number of cells of a page. For some types of memory devices (e.g., NAND), memory cells can be grouped into an erase unit, such as a physical unit, e.g., a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

Multiple blocks can be grouped together to form a plane. One or multiple planes can be grouped together to form a physical die of the memory device. A memory device can include one or more dice. A single die or multiple die stacked on top of each other can be grouped to form a package. A die is also hereinafter referred to as a logical unit (LUN). A LUN can contain one or more planes.

A memory sub-system can use a striping scheme to treat various sets of data as units when performing data operations (e.g., write, read, erase). A LUN stripe is a collection of planes that are treated as one unit when writing, reading, or erasing data. Each plane in a LUN stripe can carry out the same operation, in parallel, of all of the other planes in the LUN stripe. A block stripe is a collection of blocks, one from each plane in a LUN stripe, that are treated as a unit. The blocks in a block stripe have the same block identifier (e.g., block number) in their respective planes. A block stripe (also hereinafter referred to as a block set) can be a set of blocks arrayed across planes of different dice, such that the blocks are grouped together for purposes of data storage. Writing to block stripes is so that more data can be concurrently written and read at the same time across multiple dice. Multiple blocks of a block set can be identified as a data group.

The host file system can group data by locality and write the data sequentially to the memory devices of the memory sub-system. File systems can then write data of different localities as parallel sequential streams to memory devices, each stream having its own locality. "Locality" can refer to either temporal locality or spatial locality. Data having temporal locality is data that a processor tends to access at the same locations in a memory device repetitively over a short period of time, e.g., data written, over-written, and trimmed around the same time. Data having spatial locality captures the data retrieval patterns of when a particular location is referenced at a particular time, then it is likely that nearby locations will be referenced in the near future. In this case, a processor can attempt to determine the size and shape of the area around the currently referenced location for which it is worthwhile to prepare for faster access for subsequently referenced locations. Reference to sequential locality is a special case of spatial locality that occurs when data elements are arranged and accessed linearly, such as in traversing the elements in a one-dimensional array.

The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Conventionally, memory sub-system controllers (e.g., that include processing devices) write to memory devices randomly in small chunks of data (e.g., 4 KB), and then use large amounts of metadata to map LBA space to the physical address space of the memory devices. When a larger group of data (e.g., 100 MB or more) is written that has data locality, however, the "data group" can be sequentially written as a larger chunk to one or more block sets across multiple dice. In order to simplify mapping of such data groups, LBAs of a zone (e.g., logical address space associated with a data group) can be sequentially ordered within the LBA space and be mapped to sequentially ordered physical addresses within the physical address space. In other words, the data group can be associated with a logical block address (LBA) space zone having multiple sequential LBAs that are sequentially mapped to multiple sequential physical addresses. Memory sub-systems that can write zones of data at a time and map the zones accordingly can be said to operate in zone namespace (ZNS), e.g., where a zone of logical addresses are named/identified as a group. Advantageously, use of ZNS for logical-to-physical (LTP) address mapping greatly reduces the amount of metadata to track the LTP mapping.

In conventional memory devices, when an error event is detected in a block of memory, a memory sub-system controller (e.g., processing device) of the memory device can scan the memory device to confirm the error event, and then perform data migration upon confirmation of the error event. The error event can be a read disturb event, a program fail handling event, or a wear leveling event, among other error events, which will be discussed in detail. Data migration involves migrating a block set (that includes the block that incurred the error) to another block set of the memory device according to a migration cursor in order to safeguard valid data in view of the error.

Use of data migration within ZNS-based memory devices, where LBA space is sequentially mapped to physical address space according to zones, can increase write amplification. Data migration can also be challenging due to restrictions on over-provisioning, write amplification, and a large number of write cursors that could be open at any time writing sequential streams of locality data. Accordingly, it is possible that there is no migration cursor available to the ZNS processes of the memory sub-system. As an additional risk, ZNS does not employ redundant array of independent NAND (RAIN) protection, and thus is in search of alternative forms of data protection.

Aspects of the present disclosure address the above and other deficiencies through copying the data read from a source block of memory cells (e.g., a block that incurs an error event) to a spare block in response to detecting (and confirming) the error event. The error event, for example, can be a read disturb at the source block. This spare block can be referred to as a mitigation block in the sense of mitigating possible data corruption about to occur in the source block (flagged by the error event), and the copying can be referred to as migrating the data of the source block to the mitigation block. The mitigation block can be an overprovisioned block of the memory cells that is empty and located within an identical plane as the source block. Once the data from the source block has been migrated to the mitigation block, the controller can replace a first identifier of the source block with a second identifier of the mitigation block within a block set map data structure. In embodiments, the block set map data structure includes block location metadata for a data group (e.g., associated with a zone) of the memory device. Accordingly, the source block previously associated with the zone will be replaced by the mitigation block for the zone via remapping within the block set data structure. In this way, further read requests to the source block can be redirected to the mitigation block to ensure that valid data is returned to a requesting agent (e.g., a host system).

Advantages of the present disclosure include but are not limited to the protection of data that undergoes an error event and thus is subjected to possible corruption or loss. For example, by migrating the data from a source block to a mitigation block, the data can be safely read without incurring additional uncorrectable bit error rate (UBER). The UBER is a percentage of bits that have errors compared to total number of bits that have been read. Further, use of the disclosed embodiments lowers write amplification by not having to migrate an entire block set of data. Additionally, use of the disclosed embodiments calls for much lower overprovisioning requirements, and indeed, can use a mitigation block that comes from a block set that was already overprovisioned for another reason. Other advantages will be apparent to those skilled in the art of memory allocation and error optimization within a memory sub-system discussed hereinafter.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

Figure 1B:
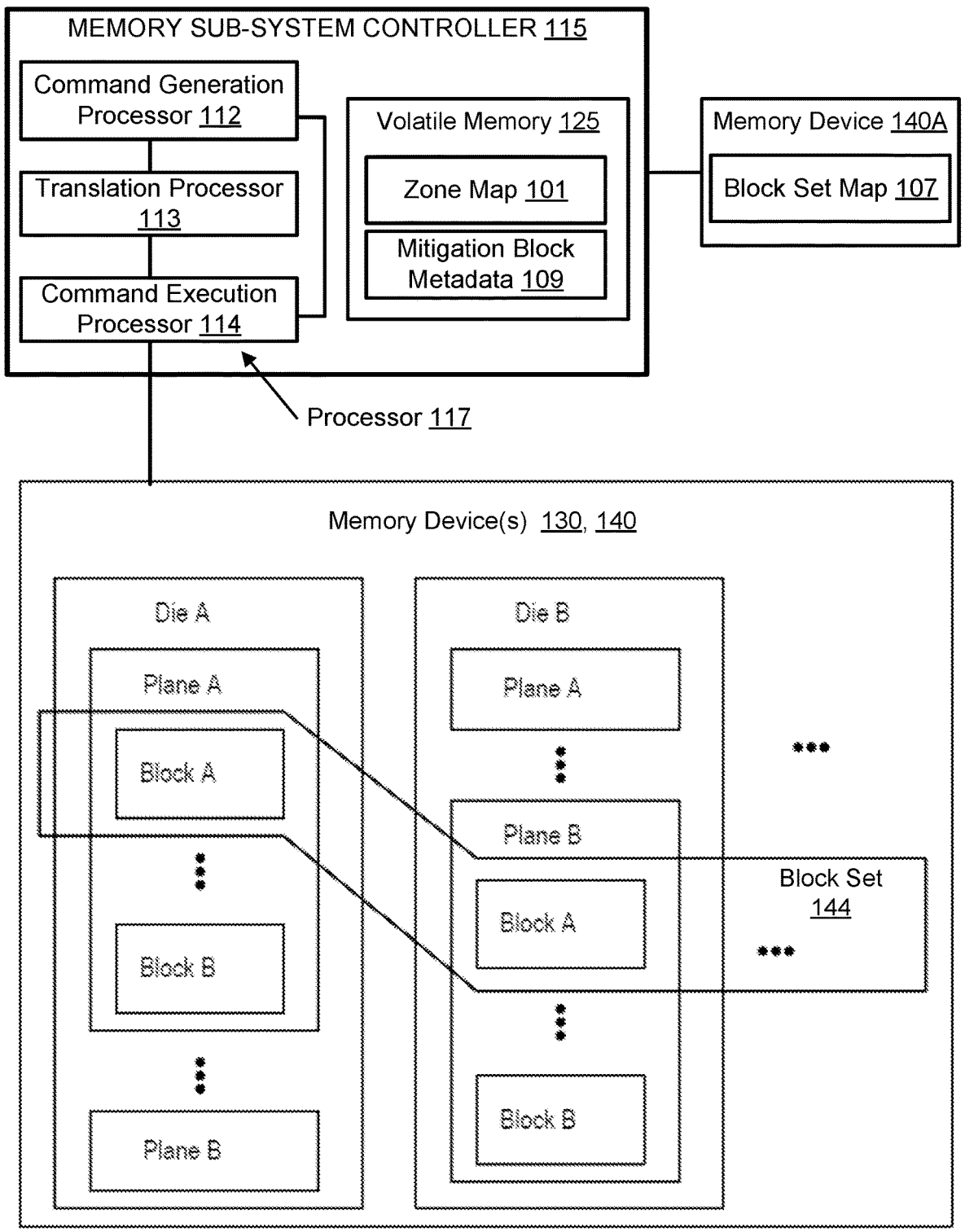
FIG. 1B illustrates the memory sub-system of FIG. 1A in additional detail according to an embodiment.
Figure 2:
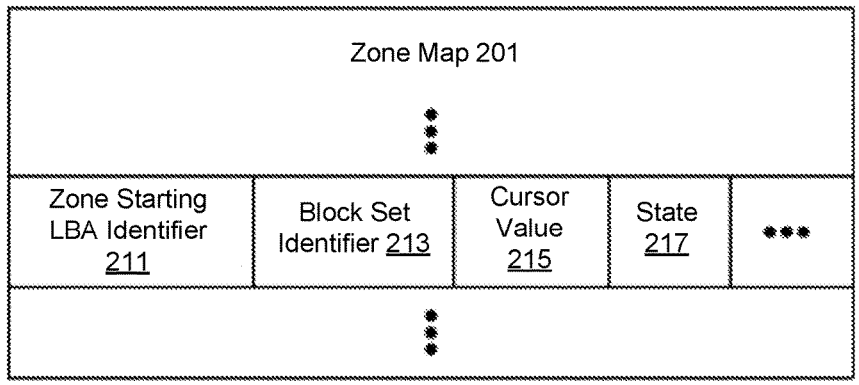
FIG. 2 is a block diagram that illustrates an example of data structures configured to support zone-based mapping according to various embodiments.
Figure 2:
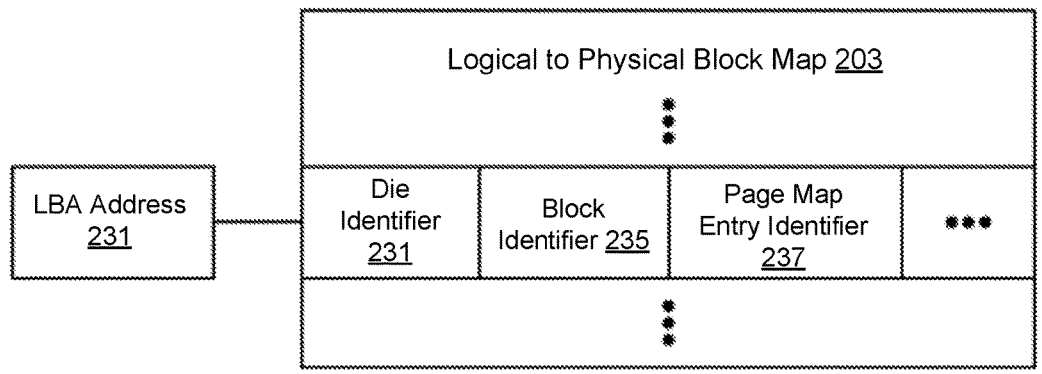
Figure 2:
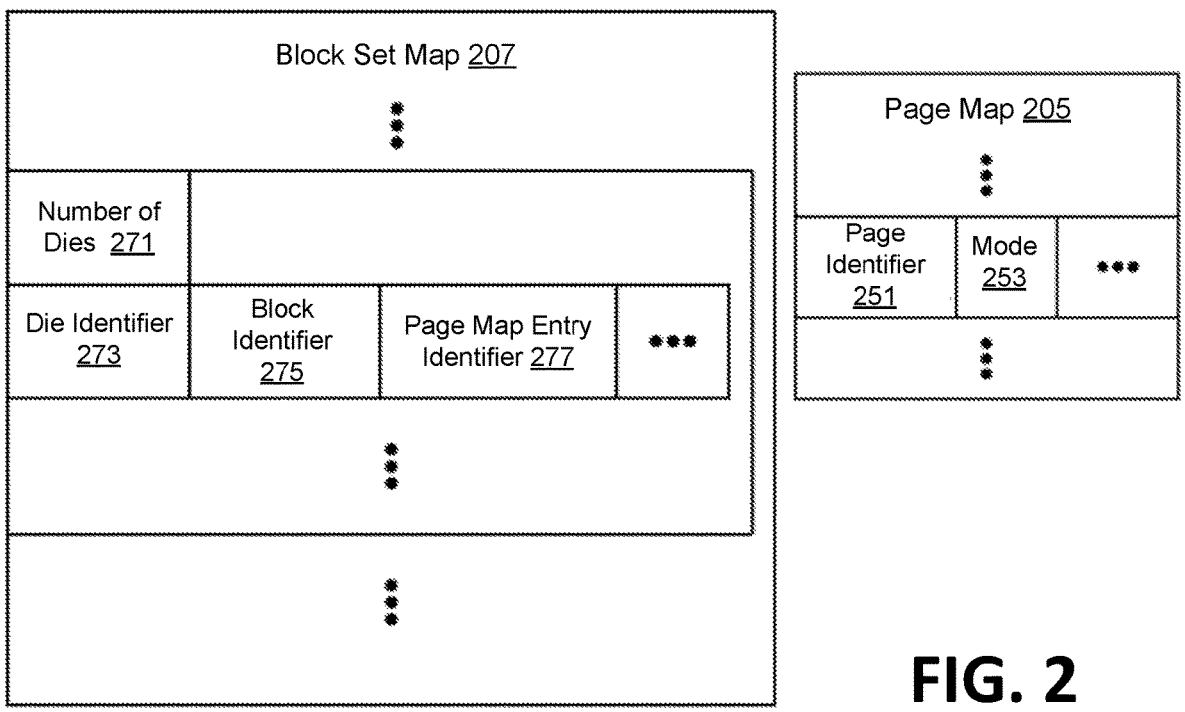

FIG. 1B illustrates the memory sub-system 110 of FIG. 1A in additional detail according to an embodiment. The memory sub-system 110 can further include a memory device 140A, which is volatile memory such as DRAM or other system memory. The memory device 140A can store a block set map data structure 107, and other larger data structures. In embodiments, the controller 115 (e.g., the processor 117 of the controller 115) includes a command generation processor 112, a translation processor 113, and a command execution processor 114. The controller 115 can further include a volatile memory 125, e.g., one or a combination of a tightly coupled memory (TCM) or a volatile memory device such as an SRAM device. The volatile memory 125 can store a zone map data structure 101 and a mitigation block metadata structure 109 among other ZNS mapping data structures, e.g., as illustrated in FIG. 2. In one embodiment, the zone map data structure 101 includes multiple entries, such that each entry has a block set entry identifier that links to an entry within the block set map data structure 107, which in turn can link to an entry of a page map data structure as will be explained in more detail with reference to FIG. 2.

In various embodiments, the command generation processor 112 performs command processing, to include processing memory commands received from the host system 120, and also generating read commands and write commands based on read requests and write operations, respectively received from the host system 120 or another requesting agent. The command execution processor 114 can sequence commands, whether received or generated, within a channel of data bus to the memory device(s) 130, 140. The command execution processor 114 can further perform error handling in the physical layer, e.g., corresponding to the physical address space. The translation processor 113 translates LBAs to physical block addresses (PBAs) of the physical address space to facilitate generation of commands by the command generation processor 112 to the command execution processor 114. Accordingly, the translation processor 113 can act as an intermediary between the command generation processor 112, which receives a memory operation with an LBA, and the command execution processor 114 that needs to know the PBA of the physical layer to fulfill a command. Operation of these various structures will be discussed in detail in the context of error handling optimization in the memory sub-system 110.

Further, as previously discussed with reference to one or more memory device(s) 130, 140, the physical address space of the multiple dice (e.g., Die A and Die B) can be hierarchically organized by plane, block, and page. So, for example, each of Die A and Die B can include Plane A and Plane B, and each of Plane A and Plane B can include Block A and Block B. A block set (or block stripe) can be defined as a group of blocks arrayed across planes of multiple dice of the memory device(s). As illustrated, a block set 144 is arrayed to include Block A of Plane A of Die A, Block A of Plane B of Die B, and so forth, e.g., also of Plane C of Die C and on to further dice, if present and online.

In various embodiments, the translation processor 113 (and/or a dynamic data placer of the controller 115 coupled to the translation processor 113) dynamically determines a layout in the memory device to place data associated with logical addresses in the memory components (also referred to as "IC dice") of the memory devices 130, 140. A layout specifies the mapping between the addresses used in commands received in the memory sub-system 110 (e.g., from the host system 120) and the physical memory locations in the memory device of the memory sub-system 110. In some embodiments, the controller 115 includes at least a portion of the translation processor 113. In other embodiments, or in combination, a controller and/or a processing device of the host system 120 includes at least a portion of the translation processor 113. For example, the controller 115, or the processing device (processor) of the host system 120, can be configured to execute instructions stored in memory for performing the operations of the translation processor 113 described herein. In some embodiments, the translation processor 113 is implemented in an integrated circuit chip disposed in the memory sub-system 110. In other embodiments, the translation processor 113 is part of an operating system of the host system 120, a device driver, or an application.

The translation processor 113 can determine the layout for a portion of logical addresses of LBA space for the placement of data at the logical addresses associated with physical addresses of the memory device 130 or 140, e.g., based on the availability within the memory device at which to write, program, store, commit data at the time of input/output scheduling in the memory sub-system 110. When IC die(s), including physical units within the IC die(s), are available for committing/programming data, a write command is scheduled for execution in the memory sub-system 110; and the translation processor 113 generates a portion of the layout for the write command and maps the logical address(es) used in the write command to map to memory locations within the IC die(s). The execution of the write command causes the memory sub-system 110 to commit/program data associated with the write command into the IC die(s).

Depending on availability of IC dice across the memory device and/or application of a sequential mapping scheme, the controller 115 can either sequentially write data groups (e.g., provided in a sequential stream of data locality) to fill up one IC die at a time or can sequentially write to multiple IC dice at a time, in parallel, e.g., to concurrently fill up the IC dice of the memory device. The mapping of the writes within the zones of the LBA space can also be done sequentially to simplify the calculations used to perform the mapping, as will be discussed in more detail with reference to ZNS mapping data structures. When there are multiple IC dice available, logical addresses (e.g., LBAs) used in the commands from multiple write streams can be mapped by the dynamically generated portion of the layout to the multiple IC dice respectively, such that there is no memory device access collision in the execution of the commands from the multiple write streams.

In various embodiments, the translation processor 113 accesses certain ones of the ZNS mapping data structures (e.g., the zone map data structure 101 and the block set map data structure 107) in order to translate LBAs to physical block addresses (PBAs) of physical address space. The translation processor 113 in the context of flash media (e.g., NOR or NAND flash memory) can be referred to as flash translation processor (FTL). The mapping employed by the translation processor 113 can generally be assumed to involve a type of block mapping, e.g., block-level mapping or log-block mapping. Where data locality is detected or in a ZNS memory device, the translation processor 113 can map a group of blocks forming a zone, e.g., within the ZNS data structures, which can involve mapping sequentially numbered LBAs to sequentially numbered PBAs, as previously discussed. The use of the ZNS data structures, and their interrelation, for mapping LBA space of a zone to physical address space of the media is discussed in more detail with reference to FIG. 2.

Another primary function of the translation processor 113 is to perform media management operations, which can include memory allocation operations, garbage collection operations, and the like. Because pages of a flash-based memory device cannot be overwritten, data updates to a page is to be updated within another page. More specifically, a new version of a page is written to a free page, e.g., which has been provisioned for this purpose. The page containing the previous version is marked as stale. When blocks contain stale pages, the blocks are to be erased before they can be written to, e.g., programmed again with new data. The process by which pages are marked as stale and erased to provide free pages that can be programmed again is referred to as garbage collection.

In ZNS embodiments, because ZNS operations write to sequential blocks, ZNS generally does not involve garbage collection of individual blocks of memory cells. This is because, for example, the aim of ZNS architecture is to get write amplification as close to one ("1") as possible, which involves little to no overprovisioning. The present disclosure, however, introduces a circumstance where source blocks, in which error events (such as read disturb) are detected can be recycled with garbage collection due to migration of data from the source block to a mitigation block. The mapping of to the physical address space at the block level is to occur in the block set map data structure 107, which can therefore be updated with location metadata related to the mitigation block, which is illustrated in detail with reference to FIG. 3.

FIG. 2 is a block diagram that illustrates an example of data structures configured to support zone-based mapping according to various embodiments. The controller 115 can store the data structures illustrated in FIG. 2 in the volatile memory 125, e.g., in SRAM, or in memory components of the memory device 140A, e.g., in DRAM. The controller 115 can also configure or implement the media layout (e.g., a layout of where a data group of a zone is to be located within physical address space) using the data structures of FIG. 2. In FIG. 2, a zone map data structure 201 is configured to provide media layout information for a zone in a namespace, e.g., the LBA space for ZNS operation. The zone map data structures 201 can be the same or similar to the zone map data structure 101 of FIG. 1B. The zone map data structure 201 can have multiple entries. Each zone map entry in the zone map data structure 201 identifies information about a zone, such as a starting LBA address 211 of the zone, a block set identifier 213 of the zone, a zone cursor value 215 of the zone, a state 217 of the zone, and the like.

The host system 120 writes data in the zone beginning at the LBA of the zone starting LBA identifier 211. The host system 120 writes data in the zone sequentially in the LBA space. After an amount of data has been written into the zone, the current starting LBA address for writing subsequent data is identified by the zone cursor value 215. Each write command for the zone moves the zone cursor value 215 to a new starting LBA address for the next write command for the zone. The state 217 can have a value indicating that the zone is empty, full, implicitly open, explicitly open, closed, and the like, to track progress of writing that zone.

In FIG. 2, a logical-to-physical block map data structure 203 is configured to facilitate the translation of LBA addresses into physical addresses in the media. The logical-to-physical block map data structure 203 can have multiple entries. An LBA can be used as, or converted into, an index for an entry in the logical to physical block map data structure 203. The index can be used to look up an entry for the LBA. Each entry in the logical-to-physical block map data structure 203 identifies, for an LBA, the physical address of a block of memory in the media. For example, the physical address of the block of memory in the media can include a die identifier 233, a block identifier 235, a page map entry identifier 237, and the like. A die identifier 233 identifies a specific IC die (e.g., Die A or Die B) in the memory device(s) 130, 140 of the memory sub-system 110. A block identifier 235 identifies a specific block of memory (e.g., NAND flash memory) within the IC die that is identified using the die identifier 233. A page map entry identifier 237 identifies an entry in the page map data structure 205.

The page map data structure 205 can have multiple entries. Each entry in the page map 205 can include a page identifier 251 that identifies a page of memory cells within a block of memory cells (e.g., NAND memory cells). For example, the page identifier 251 can include a word line number for the page and a sub block number for the page in the block of NAND memory cells. Further, the entry for the page can include a programming mode 253 of the page. For example, the page can be programmed in an SLC mode, an MLC mode, a TLC mode, or a QLC mode. When configured in the SLC mode, each memory cell in the page is to store one bit of data. When configured in the MLC mode, each memory cell in the page is to store two bits of data. When configured in the TLC mode, each memory cell in the page is to store three bits of data. When configured in the QLC mode, each memory cell in the page is to store four bits of data. Different pages in an integrated circuit die can have different modes for data programming.

In FIG. 2, the block set data structure 207 stores data controlling aspects of the dynamic layout for a zone. The block set data structure 207 can be the same or similar to the block set map data structure 107 of FIG. 1B. The block set data structure 207, which can be a table in one embodiment, can have multiple entries. Each block set entry in the block set data structure 207 identifies a number/count 271 of integrated circuit dice (e.g., Die A and Die B) in which data of the zone is stored. For each of the integrated circuit dice used for the zone, the block set entry of the block set data structure 207 has a die identifier 273, a block identifier 275, a page map entry identifier 277, a page map offset value, and the like.

The die identifier 273 identifies a specific IC die (e.g., Die A or Die B) in the memory device of the memory sub-system 110, on which IC die subsequent data of the zone can be stored. The block identifier 275 identifies a specific block of memory (e.g., NAND flash memory or other media) within the IC die that is identified using the die identifier 273, in which block the subsequent data of the zone can be stored. The page map entry identifier 237 identifies a page map entry in the page map data structure 205, which identifies a page that can be used to store the subsequent data of the zone.

For example, a memory sub-system 110 receives multiple streams of write commands. In an embodiment, each respective stream in the multiple streams is configured to write data sequentially in a logical address space in one embodiment; and in another embodiment, a stream in the multiple streams is configured to write data pseudo-sequentially, or randomly in a logical address space in one embodiment. Each write stream includes a set of commands that are tagged to write, trim, overwrite a set of data together as a group. In the group, the data can be written in a logical space sequentially, randomly, or pseudo-sequentially. Preferably, the data in the group is written into an erase block set, where memory cells in the erase block set store data for the stream but not data from other streams. The erase block set can be erased to remove the data of the stream without erasing the data of other streams.

For example, each of write streams is permitted to sequentially write at LBAs in a zone in a namespace allocated on the memory device(s) 130, 140 of the memory sub-system 110, but prohibited from writing data out of sequence in the LBA (or logical address) space. The translation processor 113 of the memory sub-system 110 identifies multiple physical units in the memory sub-system 110 that are available to write data concurrently.

The translation processor 113 can select first commands from the multiple streams for concurrent execution in the multiple physical units in the memory device that are available to write data. The translation processor 113 can generate and store, dynamically in response to the first commands being selected for concurrent execution in the multiple physical units, a portion of a layout that maps from logical addresses identified by the first commands in the logical address space to physical addresses of physical units in the multiple memory units.

The command execution processor 114 can execute the first commands concurrently by storing data into the physical units according to the physical addresses. For example, at the time of scheduling the first commands for execution, execution of second commands can be in progress in a subset of physical units of the memory device of the memory sub-system 110. Thus, the subset of physical units used for the execution of the second commands are not available for the first commands. After the first commands are scheduled and the portion of the layout for the logical addresses used in the first commands is determined, the first commands can be executed in the multiple physical units concurrently and/or concurrently with the progress of the execution of the second commands in remaining media units of the memory sub-system 110.

For example, after the identification of the multiple memory units (e.g., IC dice) that are available for the execution of next commands, the translation processor 113 can identify, from the block set data structure 207, the physical addresses that can be used to store data of the next commands. The physical addresses can be used to update the corresponding entries in the logical to physical block map data structure 203 for the LBA addresses used in the next commands.

For example, when an IC die is free to write data, the translation processor 113 can determine a command of a zone that can be written/programmed into the memory cells in the IC die. From the block set data structure 207, the translation processor 113 locates an entry for the zone, locates the block identifier 275 and the page map entry identifier 277 associated with the identifier 273 of the integrated circuit die, and uses the die identifier 273, the block identifier 275, and the page map entry identifier 277 to update the corresponding fields of the entry in the logical to physical block map data structure 203 for the LBA used in the command of the zone.

Figure 3:
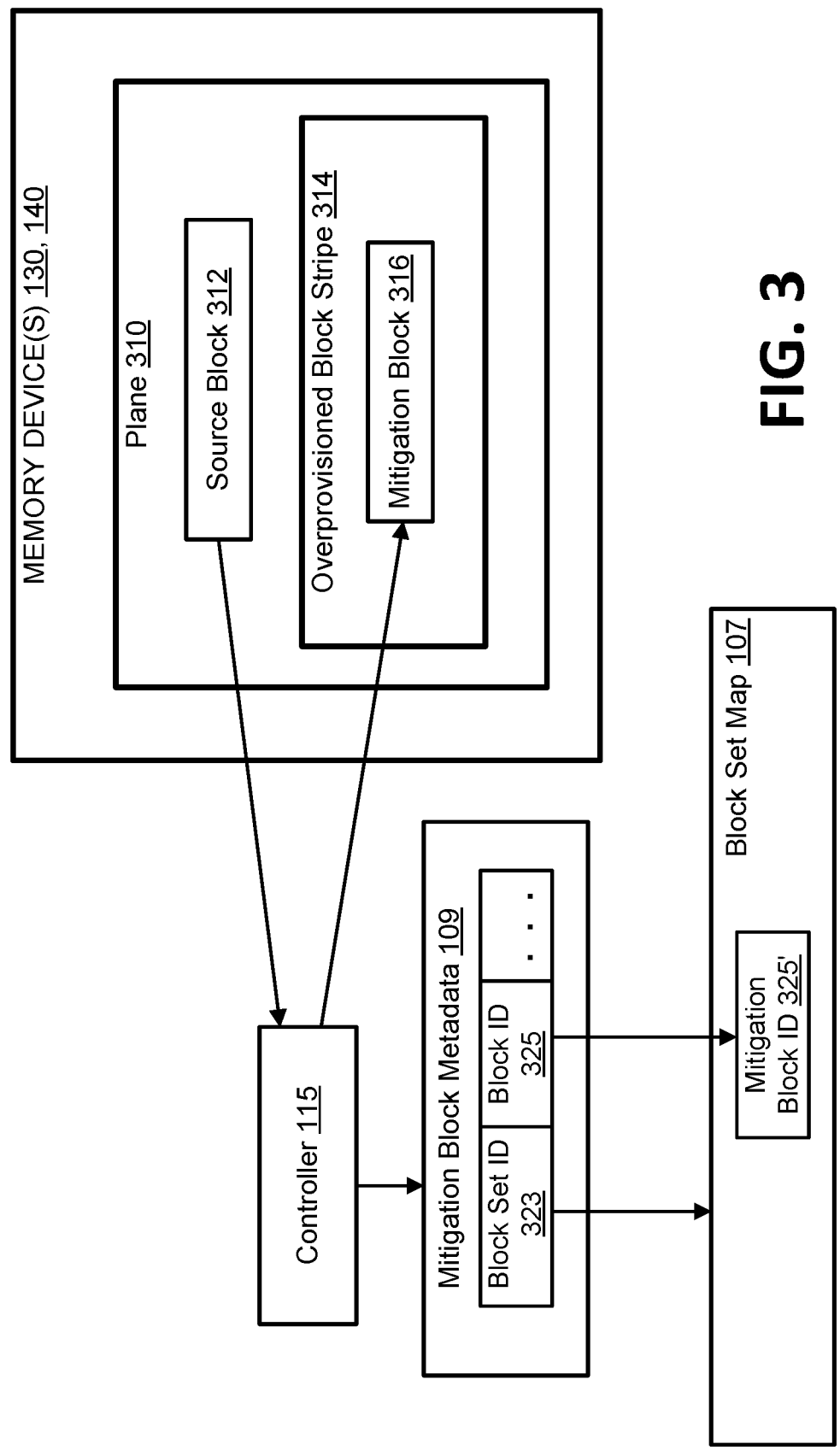
FIG. 3 is a block diagram that illustrates functionality of a controller of the memory-subsystem in remapping from a source block to a mitigation block within mapping metadata according to an embodiment.

FIG. 3 is a block diagram that illustrates functionality of the controller 115 of the memory-subsystem 110 in remapping from a source block to a mitigation block within mapping metadata according to an embodiment. In various embodiments, one or more of the memory devices 130, 140 can include a plane 310 of data as illustrated in FIG. 1B. The plane 310 can include a sub-section of a block set, in which the controller 115 (e.g., command execution processor 114) detects an error event in a block, e.g., termed a source block 312 for purposes of explanation.

The controller 115 can further perform a scan of at least the plane 310 of the memory device in which resides the source block 312 to confirm that a threshold level of the error event is met and that the error event is in fact present. In one embodiment, the threshold is a read disturb threshold in which a neighboring page of a first page is disturbed to a threshold level when the controller 115 reads from the first page. This is a characteristic of NAND geometries in which a read disturb error event can occur, and the block in which the neighboring page is present is considered the source block 312. In another embodiment, a program fail handling event occurs in which a program fail occurs at the source block 312 and a program fail handler cannot resolve the error. In still another embodiment, a wear leveling event occurs in which the number of program cycling counts for a block nears a threshold number of erase/program cycles at which the block is going to be unusable or suspended (due to having use that outpaces other blocks). In either case of the program fail handling event or the wear leveling event, the block at which these events occur can be referred to as the source block 312 for purposes of subsequent data migration.

In response to detection (and optionally confirmation) of the error event at the source block 312, the controller 115 (e.g., the command execution processor 114) can further read the data from the source block and write (e.g., program or migrate) the data into a mitigation block 316. In one embodiment, the mitigation block 316 is an overprovisioned block, e.g., in an overprovisioned block stripe 314. Overprovisioned blocks are blocks of the memory cells that are pre-erased and thus provide additional storage capacity to the controller 115. In the present context, the overprovisioned blocks are empty and located within an identical plane as the source block 312. The data that is migrated to the mitigation block 316 can be safe from the potential data corruption or data loss in the source block 312 due to the detected error event. Any in-flight read commands can continue to the source block 312. In the event of an ECC-related read error, however, the read request can be redirected to the copy of the data in the mitigation block.

In various embodiments, after writing the data to the mitigation block 316, the controller 115 (e.g., the translation processor 113) can replace identification of the source block 312 with that of the mitigation block 316 within the block set map data structure 107. The controller 115 can perform this swapping of the mapping from the source block 312 to the mitigation block 316 by retrieving new metadata associated with the location of the mitigation block 316 that is temporarily stored (e.g., by the command execution processor 114 during the migration) to the mitigation block metadata structure 109. In one embodiment, this metadata is stored in an entry that includes a block set identifier (ID) 323 and a block ID 325. The block set ID 323 links to the correct block set entry within the block set map data structure 107. The block set ID 323 thus allows the controller 115 to swap the old block ID (e.g., block identifier 275 in FIG. 2) of the source block 312 with the new block ID 325, e.g., illustrated as mitigation block ID 325' after being stored in the block set map data structure 107. In this way, the controller 115 can swap, within the block set map data structure 107, old metadata associated with a location of the source block 312 with the new metadata to remap the source block 312 to the mitigation block 316.

Figure 4:
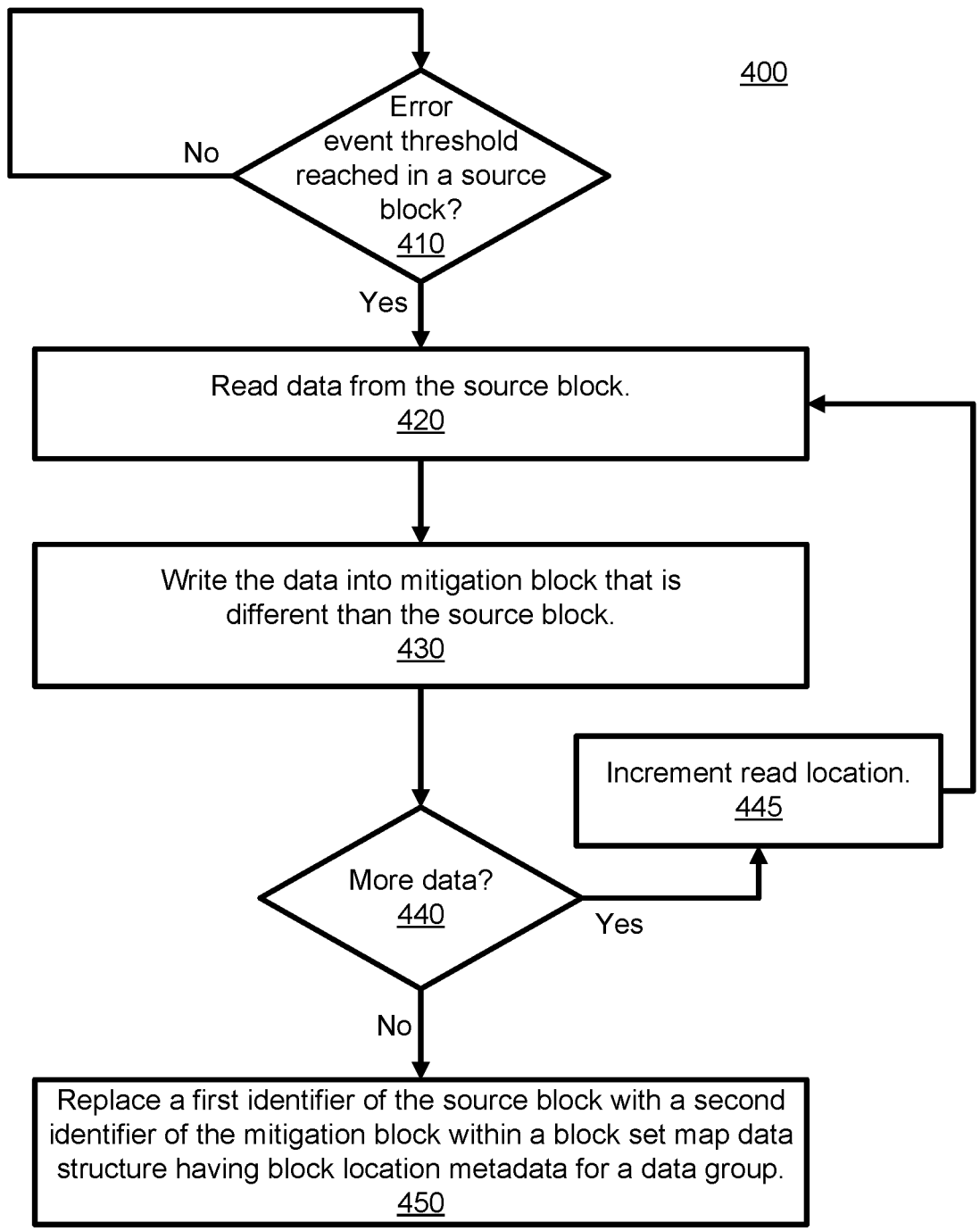
FIG. 4 is a flow chart of a method for error handling optimization according to an embodiment.

FIG. 4 is a flow chart of a method 400 for error handling optimization according to an embodiment. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the controller 115 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

With reference to FIG. 4, at operation 410, the processing logic determines whether an error event threshold is reached in a source block, e.g., such as to detect occurrence of the error event. In various embodiments, the error event is one of a read disturb event, a program fail handling event, a wear leveling event, or similar error event. If the error event threshold is reached, at operation 420, the processing logic reads data from the source block, e.g., that incurred the error event. At operation 430, the processing logic writes the data into a mitigation block that is different than the source block. The source block is associated with a zone that has logical block address (LBA) space sequentially mapped to sequentially-mapped physical address space for a data group. In one embodiment, the mitigation block is an overprovisioned block of the memory cells that is empty and located within an identical plane as the source block.

With continued reference to FIG. 4, at operation 440, the processing logic determines whether additional data is to be written to the mitigation block from the source block. If yes, at operation 445, the processing logic increments the read location within the source block and the method 400 loops back to operation 420 to copy additional data from the source block to the mitigation block. If no, there is no more data to be copied, at operation 450 the processing logic replaces (or swaps) a first identifier of the source block with a second identifier of the mitigation block within a block set map data structure. The block set map data structure can include block location metadata for a data group of the memory device. Further read requests can then be handled with commands created with a command tag that includes the second identifier that points to the mitigation block.

Figure 5:
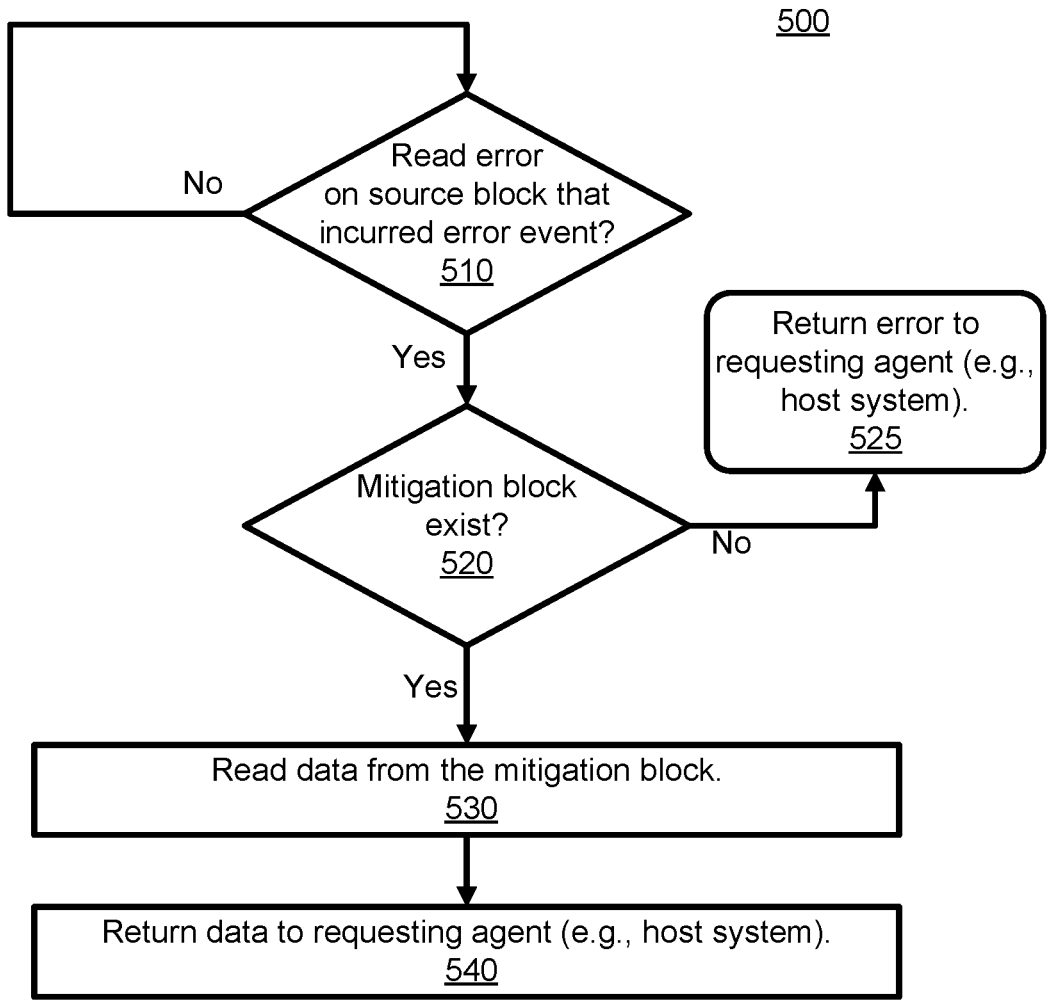
FIG. 5 is a flow chart of a method for accessing data that is being migrated to a mitigation block according to various embodiments.

FIG. 5 is a flow chart of a method 500 for accessing data that is being migrated to a mitigation block according to various embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the controller 115 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments, the features of the method 500 can be performed while the processing logic writes the data from the source block to the mitigation block. With reference to FIG. 5, at operation 510, the processing logic determines whether a read error occurs at the source block, e.g., the block that incurred the error event at operation 410. If yes, a read error is detected (e.g., an ECC error after decoding a codeword copied at least in part from the source block), at operation 520, the processing logic determines that the mitigation block exists. The processing logic can make this determination, for example, via access to the temporary entry in the mitigation block metadata structure 109.

In various embodiments, if the mitigation block does not exist, at operation 525, the processing logic returns an error to the requesting agent, e.g., which can be the host system 120 in one embodiment. Further, if the processing logic determines that the mitigation block exists, at operation 530, the processing logic reads the data from the mitigation block, e.g., in lieu of the data stored at the source block. At operation 540, the processing logic returns the data to the requesting agent or the host system 120. In this way, possible corruption or loss of data within the source block (due to the detected error event) can be avoided during the migration process and the remapping of the source block to the mitigation block within the block set map data structure. If the data that is the subject of the read request is not yet in the mitigation block, the processing error can conduct error handling, a part of which can include to retry reading the source block. During the delay caused by the error handling, the data can have been written to the mitigation block and possibly already remapped within the block set map data structure. In this way, the delay should resolve the error by making the data available to the processing device once written to the mitigation block.

Figure 6:
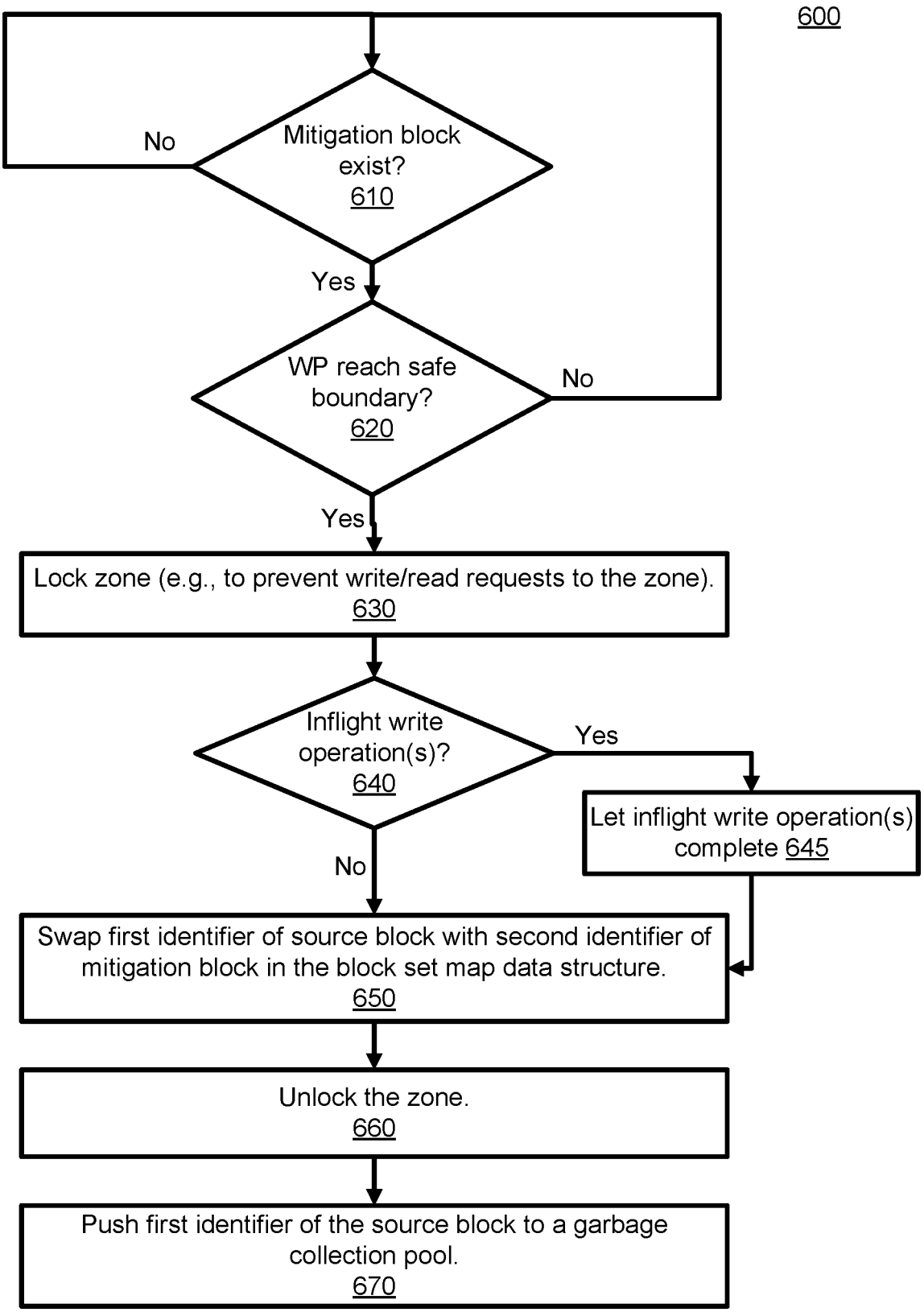
FIG. 6 is a flow chart of a method for remapping a source block, in which an error is detected, to a mitigation block according to an embodiment.

FIG. 6 is a flow chart of a method 600 for remapping a source block, in which an error is detected, to a mitigation block according to an embodiment. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the controller 115 of FIGS. 1A-1B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In various embodiments, the method 600 can be performed in order to carry out the remapping reference at operation 450 of FIG. 4. With reference to FIG. 6, at operation 610, the processing logic determines whether a mitigation block exists, e.g., the mitigation block 316 (FIG. 3) that received migrated data from the source block (e.g., source block 312 of FIG. 3). The processing logic can make this determination via access to a temporary entry within the mitigation block metadata structure 109, as discussed with reference to FIG. 3. At operation 620, the processing logic determines whether a write pointer has reached a safe boundary. Reaching a safe boundary refers to the write pointer for the mitigation block being equal to a pointer in the source block. Making the safe boundary determination can facilitate performance of the method 500 of FIG. 5 in knowing where to read from if the source block incurs a read error before updating the mapping within the block set map data structure.

If the mitigation block exists and the write pointer has reached a safe boundary, at operation 630, the processing logic locks a zone that is mapped to the source block. The lock can be put in place to prevent subsequent write requests directed at the zone, although the lock results in also preventing subsequent read requests directed at the zone. At operation 640, the processing logic determines whether there are any inflight write operations occurring. For example, if a write operation has begun (but not finished) at a block to which the zone is mapped, this is referred to an inflight write operation. If there are inflight write operations that have not yet completed, at operation 645, the processing logic lets the inflight write operations complete before proceeding. Otherwise, the method can continue to operation 650. These inflight write operations can include allowing completion of copying the data from the source block to the mitigation block.

With continued reference to FIG. 6, at operation 650, the processing logic swaps a first identifier of the source block with a second identifier of the mitigation block in the block set map data structure. This block swapping is described in additional detail with reference to FIG. 3 and operation 450 of method 400 (FIG. 4). At operation 660, the processing logic unlocks the zone after the replacement (or swap) of the identifiers. Accordingly, the locking of the zone can occur before the swapping of the block identifiers and the unlocking of the zone can occur after the swapping of the block identifiers. The locking insures proper coherency of accessed data while coherency metadata associated with the block set of which the block is a part is being updated, as per operation 650. At operation 670, the processing logic pushes the first identifier of the source block to a garbage collection pool. The garbage collection pool can involve blocks that, at a threshold size, will be erased and provisioned for being programmed with new data.

Figure 7:
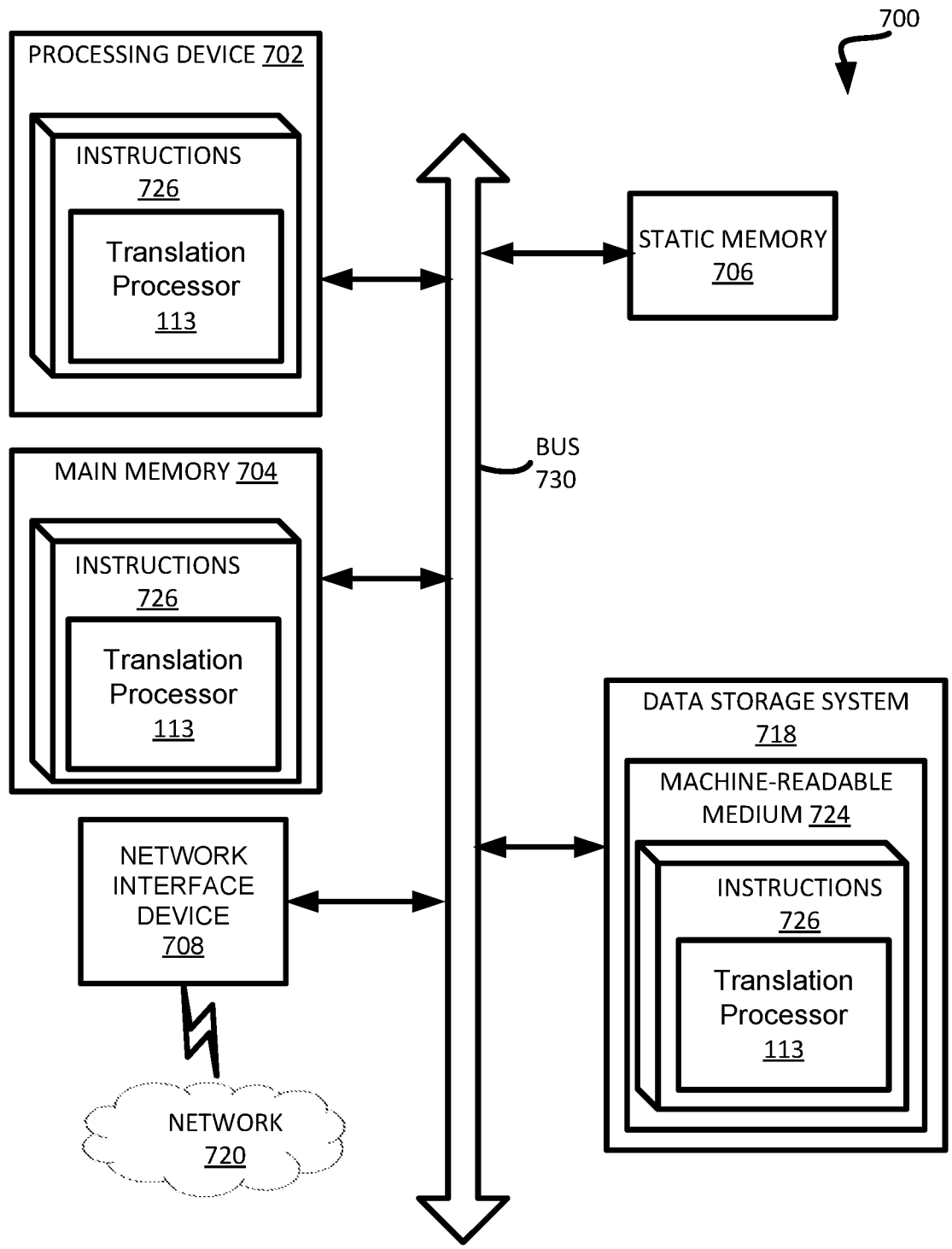
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIGS. 1A-1B.

In one embodiment, the instructions 726 include instructions to implement functionality corresponding to the translation processor 113 of FIG. 1B. While the machine-readable storage medium 724 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of blocks of memory cells; and
a processing device operatively coupled to the memory device, the processing device to perform operations comprising:
   detecting an error event triggered within a source block of the plurality of blocks of memory cells;
   reading data from the source block;
   writing the data into a mitigation block that is different than the source block; and
   replacing, in a mapping data structure, a first identifier of the source block with a second identifier of the mitigation block, wherein the replacing comprises:
      locking a data group, which includes the source block, to prevent subsequent write requests and read requests directed at the data group;
      replacing the first identifier with the second identifier after locking the data group; and
      unlocking the data group after the replacement.

2. The system of claim 1, wherein the mapping data structure comprises block location metadata for the data group, which is associated with a logical block address (LBA) space zone comprising a plurality of sequential LBAs that are sequentially mapped to a plurality of sequential physical addresses.

3. The system of claim 1, wherein the error event comprises at least one of a read disturb event, a program fail handling event, or a wear leveling event.

4. The system of claim 1, wherein the mitigation block is an overprovisioned block of the plurality of blocks of memory cells that is located within an identical plane as the source block.

5. The system of claim 1, wherein, while writing the data into the mitigation block, the operations further comprise:
   detecting a read error at the source block in response to a read request;
   determining that the mitigation block exists;
   reading the data from the mitigation block; and
   returning the data to a host system that requested the data.

6. The system of claim 1, wherein, in response to a read request to the source block, the operations further comprise returning the data from the mitigation block identified by the mapping data structure.

7. The system of claim 1, wherein the replacing further comprises pushing the first identifier of the source block to a garbage collection pool.

8. A method comprising:
detecting, by a processing device coupled to a memory device, an error event triggered within a source block of the memory device; and
reading, by the processing device, data from the source block;
writing, by the processing device, the data into a mitigation block that is different than the source block; and
replacing, by the processing device in a mapping data structure, a first identifier of the source block with a second identifier of the mitigation block, wherein the replacing comprises:
locking a data group, which includes the source block, to prevent subsequent write requests and read requests directed at the data group;
performing the replacing after locking of the data group; and
unlocking the data group after performing the replacing.

9. The method of claim 8, wherein the error event comprises at least one of a read disturb event, a program fail handling event, or a wear leveling event.

10. The method of claim 8, wherein the mitigation block is an overprovisioned block of the plurality of blocks of memory cells that is located within an identical plane as the source block.

11. The method of claim 8, further comprising, during the writing:
detecting a read error at the source block in response to a read request;
determining that the mitigation block exists;
reading the data from the mitigation block; and
returning the data to a host system that requested the data.

12. The method of claim 8, wherein, in response to a read request to the source block, the method further comprises returning the data from the mitigation block identified by the mapping data structure.

13. The method of claim 8, wherein the replacing further comprises:
determining that a write pointer for the mitigation block is equal to a pointer in the source block; and
pushing the first identifier of the source block to a garbage collection pool.

14. A non-transitory computer-readable medium storing instructions, which when executed by a processing device coupled to a memory device, cause the processing device to perform operations comprising:

detecting an error event triggered within a source block of the memory device;
identifying, among a plurality of blocks of memory cells of the memory device, a mitigation block that stores migrated data from the source block, wherein the source block is identified with a first identifier;
identifying a second identifier from metadata associated with the mitigation block; and
replacing, within a mapping data structure, the first identifier with the second identifier, wherein the replacing comprises:
locking a data group that includes the source block, wherein the locking is to prevent subsequent write requests and read requests directed at the data group;
swapping, within the mapping data structure after the locking, old metadata associated with the source block with the metadata associated with the mitigation block; and
unlocking the data group after the swapping.

15. The non-transitory computer-readable medium of claim 14, wherein the replacing further comprises:
determining that a write pointer for the mitigation block is equal to a pointer in the source block; and
pushing the first identifier of the source block to a garbage collection pool.

16. The non-transitory computer-readable medium of claim 15, wherein the operations further comprise, between the locking and the unlocking of the data group, completing any inflight write operations directed at a block set containing the mitigation block.

17. The non-transitory computer-readable medium of claim 14, wherein the operations further comprise:
receiving a read request from a host system to the source block;
accessing a mapping within the mapping data structure between the source block and the mitigation block; and
transmitting, to the host system based on the mapping, migrated data stored in the mitigation block.

18. The non-transitory computer-readable medium of claim 14, wherein the error event comprises at least one of a read disturb event, a program fail handling event, or a wear leveling event.

19. The non-transitory computer-readable medium of claim 14, wherein the mitigation block is an overprovisioned block of the plurality of blocks of memory cells that is located within an identical plane as the source block.

20. The non-transitory computer-readable medium of claim 14, wherein the operations further comprise, in response to detecting the error event:
reading the data from the source block; and
writing the data into the mitigation block that is different than the source block.

* * * * *